UNITED STATES PATENT OFFICE.

JACOB BUMP, OF KIRTLAND, OHIO.

IMPROVEMENT IN CEMENT FOR COVERING BUILDINGS, &c.

Specification forming part of Letters Patent No. 1,765, dated September 3, 1840.

*To all whom it may concern:*

Be it known that I, JACOB BUMP, of Kirtland, in the county of Lake and State of Ohio, have invented a new and improved cement for the purpose of covering all the outer parts of buildings, either wood, stone, or brick, or for floors, hearths, door-steps, sidewalks, fences, or water-cisterns, of which the following is a specification.

This cement is composed of the following articles, viz: to one bushel of clean sand, half a bushel quicklime, one-eighth water-lime, one-eighth pulverized hard stone, granite, or clean gravel, half-gallon hot tar, one pound copperas, one pound alum, one-eighth of a bushel of cinders, (furnace or smith's,) pulverized glass will answer. Mix the above ingredients well together, let it stand one day or more; then fit for use, to be kept tempered to spread like plastering-mortar.

Directions for using the above cement:

First, for the outside of buildings, lay on common coats of mortar with as little lime as will spread comfortably. When partly dry, lay on a coat of the cement about one-eighth of an inch thick. Cornices or bases may be put onto buildings with the same material.

Second, for coarser work, (fences, sidewalks, door-steps, and other uses,) add a sufficient quantity of coarse gravel so as to suit the eye.

The above cement may be shaded with lamp-black.

What I claim as my invention, and desire to secure by Letters Patent, is—

A cement composed of the aforesaid materials.

JACOB BUMP.

Witnesses:
G. L. GIBERSON,
HIRAM KELLOGG.